United States Patent
Tait et al.

(10) Patent No.: US 10,618,438 B2
(45) Date of Patent: Apr. 14, 2020

(54) VEHICLE SEAT WITH A THERMAL DEVICE

(71) Applicant: Faurecia Automotive Seating, LLC, Auburn Hills, MI (US)

(72) Inventors: Shaun D. Tait, Troy, MI (US); Charles J. Cauchy, Traverse City, MI (US); Chad W. Durkee, Troy, MI (US); Kevin L. Wright, Highland, MI (US); John M. Perraut, Lake Orion, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 260 days.

(21) Appl. No.: 15/787,161

(22) Filed: Oct. 18, 2017

(65) Prior Publication Data

US 2018/0111527 A1 Apr. 26, 2018

Related U.S. Application Data

(60) Provisional application No. 62/411,221, filed on Oct. 21, 2016.

(51) Int. Cl.
*B60N 2/56* (2006.01)
*B60N 2/58* (2006.01)
(Continued)

(52) U.S. Cl.
CPC .......... *B60N 2/5678* (2013.01); *B60N 2/5642* (2013.01); *B60N 2/58* (2013.01);
(Continued)

(58) Field of Classification Search
CPC .......... F25B 21/04; F25B 21/02; F25B 21/00; H01L 35/32; H01L 35/30; B60N 2/5678; B60N 2/5642; B60N 2/58
See application file for complete search history.

(56) References Cited

U.S. PATENT DOCUMENTS 6,486,452 B2 * 11/2002 Loyd, Sr. ................ A61F 7/007
219/212
7,183,519 B2 2/2007 Horiyama
(Continued)

FOREIGN PATENT DOCUMENTS

CA 2940929 3/2017
EP 2631114 A1 8/2013
(Continued)

OTHER PUBLICATIONS

Office Action dated Oct. 30, 2018 for U.S. Appl. No. 14/820,175 (pp. 1-21).
(Continued)

*Primary Examiner* — Joseph F Trpisovsky
(74) *Attorney, Agent, or Firm* — Barnes & Thornburg LLP

(57) ABSTRACT

An occupant support adapted for use in a vehicle includes a cushion, a cushion cover, and a thermoelectric unit. The cushion is adapted to support an occupant on the occupant support. The cushion cover is arranged around at least a portion the cushion. The thermoelectric unit is configured to selectively heat and cool the occupant of the occupant support with conductive heat transfer through the cushion cover.

20 Claims, 11 Drawing Sheets

(51) Int. Cl.
*F25B 21/04* (2006.01)
*G05D 23/22* (2006.01)

(52) U.S. Cl.
CPC ......... *F25B 21/04* (2013.01); *F25B 2321/023* (2013.01); *G05D 23/22* (2013.01)

(56) References Cited

U.S. PATENT DOCUMENTS

| | | | |
|---|---|---|---|
| 7,478,869 | B2 | 1/2009 | Lazanja |
| 7,587,901 | B2 | 9/2009 | Petrovski |
| 8,393,162 | B2 | 3/2013 | Chung |
| 8,397,518 | B1 | 3/2013 | Vistakula |
| 9,676,310 | B2 | 6/2017 | Fitzpatrick |
| 10,179,526 | B2 | 1/2019 | Marquette |
| 2005/0066505 | A1 | 3/2005 | Iqbal |
| 2006/0130490 | A1 | 6/2006 | Petrovski |
| 2007/0035162 | A1 | 2/2007 | Bier |
| 2009/0134675 | A1 | 5/2009 | Pfahler |
| 2012/0080911 | A1 | 4/2012 | Brykalski |
| 2015/0048658 | A1 | 2/2015 | Gawade |
| 2016/0039321 | A1 | 2/2016 | Dacosta-Mallet |
| 2016/0152167 | A1* | 6/2016 | Kozlowski ........... B60N 2/5692 297/180.12 |
| 2016/0304013 | A1 | 10/2016 | Wolas |
| 2017/0066355 | A1 | 3/2017 | Kozlowski |
| 2017/0164757 | A1* | 6/2017 | Thomas ................. A47C 7/021 |
| 2017/0181225 | A1 | 6/2017 | Inaba |
| 2017/0232873 | A1 | 8/2017 | Hall |
| 2017/0305312 | A1 | 10/2017 | Haller |
| 2017/0354190 | A1 | 12/2017 | Cauchy |
| 2018/0111527 | A1 | 4/2018 | Tait |
| 2018/0272836 | A1 | 9/2018 | Humer |
| 2018/0281641 | A1 | 10/2018 | Durkee |

FOREIGN PATENT DOCUMENTS

| | | |
|---|---|---|
| EP | 3111904 A1 | 1/2017 |
| JP | 2006021600 | 1/2006 |
| KR | 1020020062289 A | 7/2002 |
| KR | 1020070051116 A | 5/2007 |
| KR | 101154518 B1 | 6/2012 |
| KR | 20120064814 | 6/2012 |
| KR | 101565107 | 11/2015 |
| WO | 2006117690 | 11/2006 |
| WO | 2007020526 | 2/2007 |
| WO | 2008023942 | 2/2008 |
| WO | 2008103742 | 8/2008 |
| WO | 2015044725 | 4/2015 |
| WO | 2015085150 | 6/2015 |

OTHER PUBLICATIONS

Korean Notice of Preliminary Rejection for Korean App. No. 10-2015-7010107 dated Jul. 9, 2019, 3368 KR II, 23 pages.

Office Action dated Apr. 5, 2018 for U.S. Appl. No. 14/820,175 (pp. 1-12).

* cited by examiner

VEHICLE SEAT WITH A THERMAL DEVICE

PRIORITY CLAIM

This application claims priority under 35 U.S.C. § 119(e) to U.S. Provisional Application No. 62/411,221, filed Oct. 21, 2016, which is expressly incorporated by reference herein.

BACKGROUND

The present disclosure relates to occupant supports, and particularly to occupant supports configured to provide heat transfer between the occupant support and an occupant of the occupant support. More particularly, the present disclosure relates to occupant supports configured to cool and heat the occupant of the occupant support.

SUMMARY

According to the present disclosure, a vehicle includes an occupant support mounted to a floor of the vehicle. The occupant support includes a seat bottom coupled to the floor of the vehicle for movement therewith and a seat back that extends upwardly away from the seat bottom.

Each of the seat bottom and the seat back include a cushion and a cushion cover. The cushion is adapted to support an occupant of the occupant support. The cushion cover is arranged around at least a portion of the cushion.

In illustrative embodiments, the occupant support further includes a thermoelectric unit configured to selectively heat and cool the occupant with conductive heat transfer through the cushion cover. The thermoelectric unit includes a thermal engine located in the cushion and a flexible thermally-conductive strip located between the thermal engine and the cushion cover. The flexible thermally-conductive strip is coupled to the thermal engine. The thermoelectric unit is configured to move between a heating mode in which the thermal engine heats the flexible thermally-conductive strip and a cooling mode in which the thermal engine removes heat from the flexible thermally-conductive strip.

In illustrative embodiments, the flexible thermally-conductive strip includes an intermediate portion, a first arm that extends away from the intermediate portion, and a second arm that extends away from the intermediate portion opposite the first arm to locate the intermediate portion between the first arm and the second arm. The thermal engine is coupled to the intermediate portion of the flexible thermally-conducive strip.

In illustrative embodiments, the cushion includes a bottom pad and a topper pad. The bottom pad is spaced apart from the cushion cover to locate the topper pad between the bottom pad and the cushion cover. The thermal engine is located in the bottom pad and the topper pad includes a panel and an engine cover. The panel is arranged along the bottom pad and is formed to include a cover-receiving aperture therein. The engine cover is located in the cover-receiving aperture between the thermal engine and the cushion cover.

In illustrative embodiments, the thermoelectric unit further includes a supplemental thermally-conductive strip spaced apart from the thermal engine to locate the engine cover between the supplemental thermally-conductive strip and the thermal engine. The supplemental thermally-conductive strip extends between and interconnects the first arm of the flexible thermally-conductive strip and the second arm of the flexible thermally-conductive strip. In illustrative embodiments, the first arm extends between the panel and the engine cover at an angle of between about 30 degrees and about 65 degrees.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
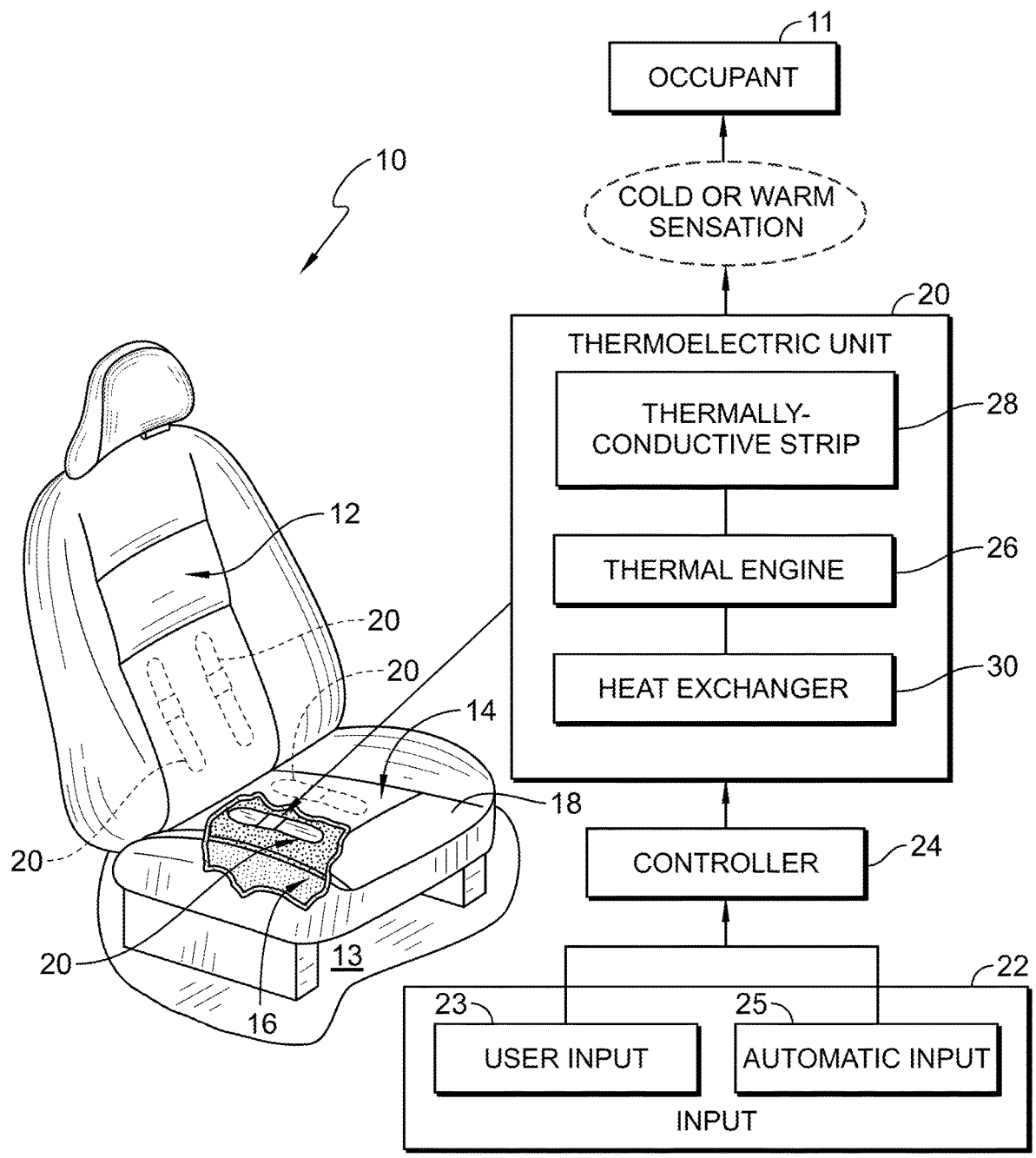
FIG. 1 is a perspective and diagrammatic view of an occupant support adapted for use in a passenger vehicle showing that the occupant support includes a seat bottom mounted to a floor of the vehicle, a seat back mounted to the seat bottom, and each of the seat bottom and the seat back include a thermoelectric unit configured to be controlled with a controller to apply a cold or warm sensation to an occupant of the occupant support using conduction through a cushion cover of the occupant support.

An occupant support 10 in accordance with the present disclosure is shown in FIG. 1. Occupant support 10 is configured to support an occupant 11 above a floor 13 of a vehicle. Occupant support 10 includes a cushion 16, a cushion cover 18 arranged around cushion 16, and thermoelectric unit 20 located between cushion 16 and cushion cover 18. Thermoelectric unit 20 is configured to heat or cool selectively occupant 11 through cushion cover 18 in response to an input 22.

Figure 2:
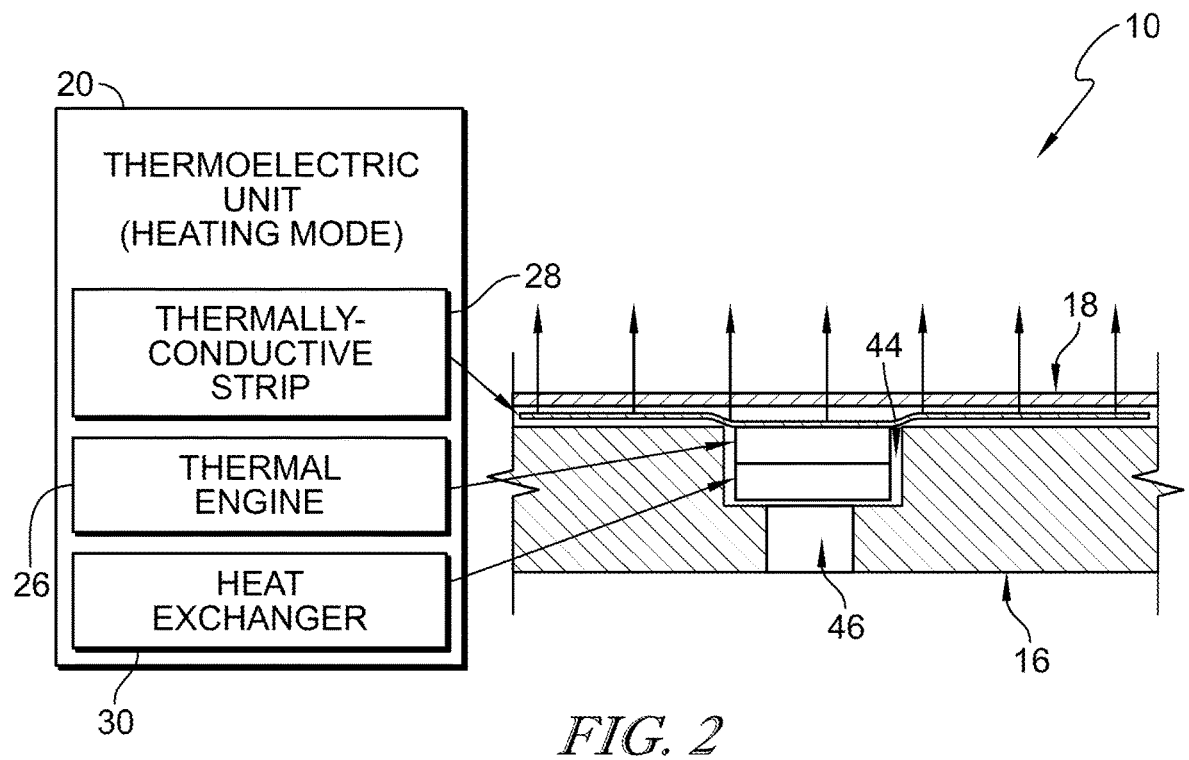
FIG. 2 is a sectional and diagrammatic view of the thermoelectric unit showing that the thermoelectric unit includes a thermally-conductive strip, a thermal engine coupled to the thermally-conductive strip, and a heat exchanger coupled to the thermal engine and suggesting that the thermoelectric unit is operable in a heating mode in which the thermal engine generates heat which is transferred to the occupant via conduction through the thermally-conductive strip.
Figure 3:
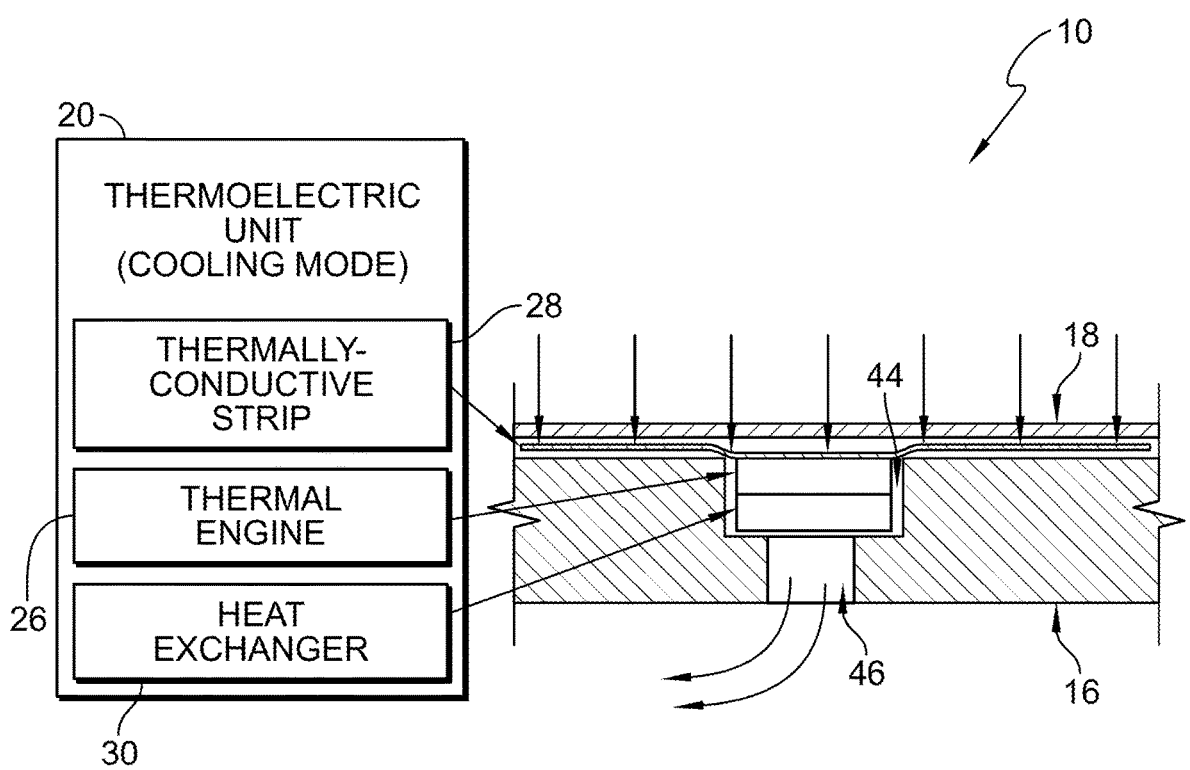
FIG. 3 is a sectional and diagrammatic view of the thermoelectric unit showing that the thermoelectric unit includes the thermally-conductive strip, the thermal engine coupled to the thermally-conductive strip, and the heat exchanger coupled to the thermal engine and suggesting that the thermoelectric unit is operable in a cooling mode in which the thermal engine removes heat from the occupant via conduction through the thermally-conductive strip and exhausts the heat with the heat exchanger.

Thermoelectric unit 20 includes a thermal engine 26, a thermally-conductive strip 28, and a heat exchanger 30 as shown in FIGS. 1-3. Thermal engine 26 is located in cushion 16 and generates heat or removes heat selectively in response to input 22. Thermally-conductive strip 28 is coupled to thermal engine 26 and extends between cushion cover 18 and cushion 16 to disperse heat generated by thermal engine 26 to occupant 11 when thermoelectric unit 20 is in a heat mode as suggested in FIG. 2 and to conduct heat away from occupant 11 to thermal engine 26 when thermoelectric unit 20 is in a cool mode as suggested in FIG. 3. Heat exchanger 30 is coupled to thermal engine 26 and configured to conduct rejected heat away from thermal engine 26 when thermoelectric unit 20 is in the cool mode. Heat exchanger 30 may extract heat from ambient air when thermoelectric unit 20 is in the heat mode.

Occupant support 10 further includes a controller 24 as shown in FIG. 1. Thermoelectric device 70 is connected to controller 24 and controller 24 is configured to control the transmission and flow direction of electric energy to thermoelectric device 70. Controller 24 is configured to transmit commands to thermoelectric unit 20 in response to one or more inputs 22. Inputs 22 may be user inputs 23 or automatic inputs 25. Manual input is adjusted and controlled by occupant 11.

In automatic mode, occupant support 10 determines occupant 11 body temperature by the use of sensors placed under cushion cover 18 and regulates thermoelectric unit 20 temperature by providing warm or cold sensations to maximize thermal comfort. Automatic mode may also be associated with an intelligent system integrated into a vehicle. The intelligent system may be included in an autonomous or semi-autonomous vehicle to provide thermal therapies. The therapies may include warming sensation, cooling sensation, alternating warming and cooling sensation to maximize comfort, provide related sensations, mitigate fatigue, and avoid drowsiness and other similar conditions.

Controller 24 may provide various thermal comfort options for occupant 11. For example, thermoelectric units 20 in seat bottom 12 may be in the cooling mode while thermoelectric units 20 in seat back 14 may be inactive. In another example, thermoelectric units 20 in seat bottom 12 may be inactive while thermoelectric units 20 in seat back 14 may be in the heating mode or cooling mode.

Occupant support 10 includes a seat bottom 12 and a seat back 14 as shown in FIG. 1. Seat bottom 12 is coupled to floor 13 to support occupant 11 in the vehicle. Seat back 14 is coupled to seat bottom 12 and extends upward and away from seat bottom 12. Seat back 14 is configured to pivot relative to seat bottom 12 between an upright position and a folded forward position. Each of seat bottom 12 and seat back 14 include cushion 16, cushion cover 18, and thermoelectric units 20.

Two thermoelectric units 20 are incorporated into seat bottom 12 as shown in FIG. 1. Thermoelectric units 20 are spaced apart from one another laterally and extend between a front and a back of seat bottom 12. Two thermoelectric units 20 are incorporated into seat back 14. Thermoelectric units 20 are spaced apart from one another laterally and extend between a top and bottom of seat back 14. In other embodiments, one or more thermoelectric units 20 are included in only one of seat bottom 12 or seat back 14. In some embodiments, seat bottom 12 and seat back 14 include a different number and/or a different arrangement of thermoelectric units 20.

Figure 4:
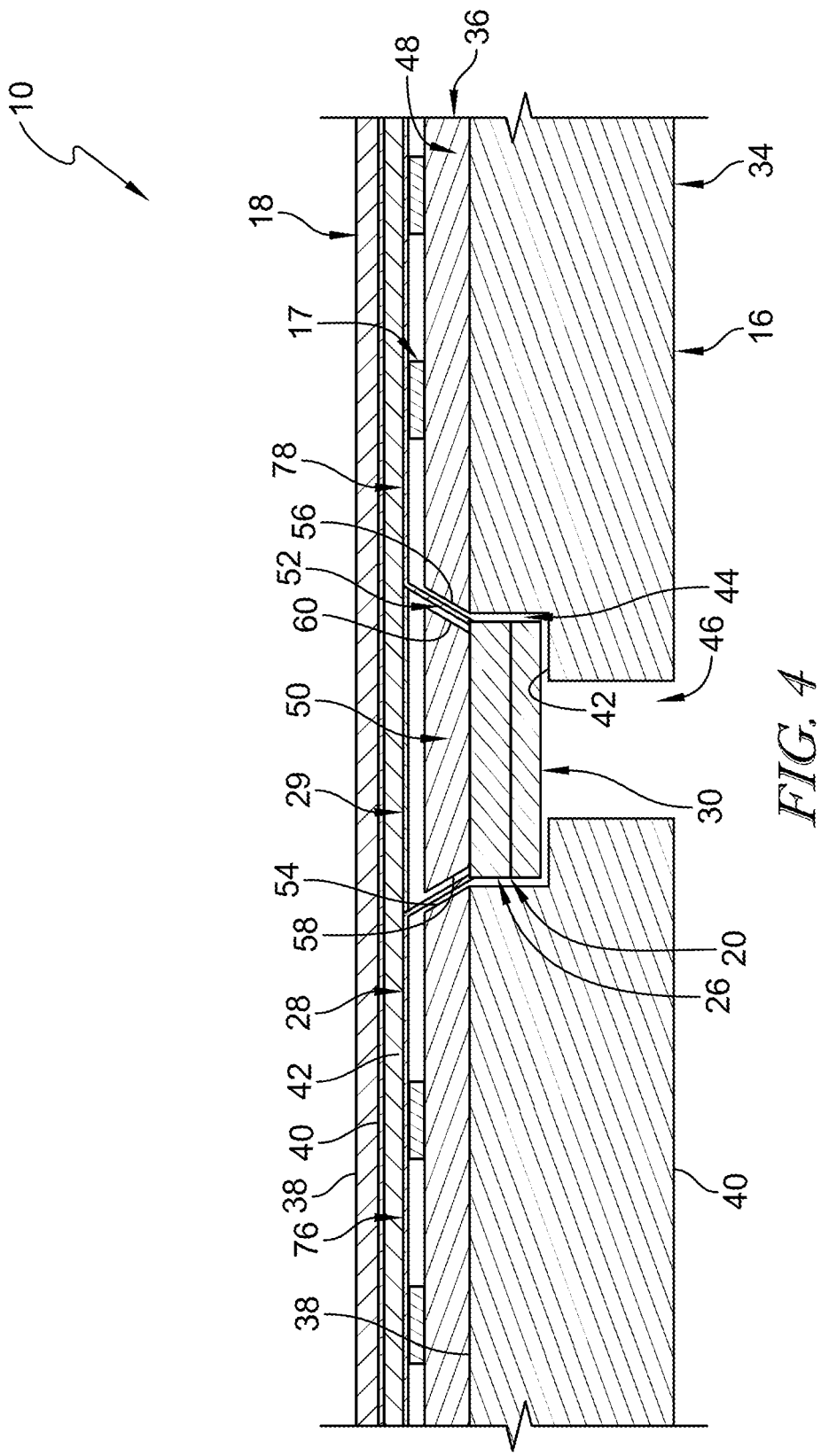
FIG. 4 is a sectional view of the seat bottom of FIG. 1 showing that the seat bottom includes a cushion and a cushion cover, the thermal engine is located in the cushion, and the thermally-conductive strip is located between the thermal engine and the cushion cover, and further showing that the occupant support includes a plurality of massage bladders located between the thermally-conductive strip and the cushion.

Cushion 16 is configured to support occupant 11 and is deformable to an extent to adjust to a contour of occupant 11 as suggested in FIG. 1. Cushion 16 comprises foam material as suggested in FIG. 4. Cushion 16 includes a bottom pad 34 and a topper pad 36 as shown in FIG. 4. Bottom pad 34 and topper pad 36 may be formed with foam of different formulations. Bottom pad 34 is relatively stiffer than topper pad 36 in the illustrative embodiment.

Bottom pad 34 includes an upper surface 38, a lower surface 40, and an intermediate surface 42 as shown in FIG. 4. Bottom pad 34 is formed to include an engine-receiving aperture 44 and an airflow passageway 46. Engine-receiving aperture 44 extends from the upper surface 38 to the intermediate surface 42. Airflow passageway 46 extends from the intermediate surface 42 to the lower surface 40. Airflow passageway 46 opens into engine-receiving aperture 44. Thermal engine 26 and heat exchanger 30 included in thermoelectric unit 20 are located in engine-receiving aperture 44 as shown in FIG. 4.

Topper pad 36 may comprise foam material infused with thermally conductive particles. In some examples, the thermally conductive particles comprise graphene. In other embodiments, the thermally conductive particles comprise metallic particles, carbon based particles, and/or any other suitable alternative. In other embodiments, topper pad 36 comprises foam material without thermally conductive particles. In other embodiments, topper pad 36 comprises gel material. In some embodiments, the gel material is infused with thermally conductive particles. In some embodiments, the gel material comprises thermally conductive material. In some embodiments, the topper pad 36 comprises a mesh of conductive material such as, for example, a copper mesh.

Topper pad 36 includes a panel 48 and a engine cover 50 as shown in FIG. 4. Panel 48 extends along upper surface 38 of bottom pad 34. Panel 48 is formed to include a cover-receiving aperture 52 that extends through panel 48 and is aligned with engine-receiving aperture 44 formed in bottom pad 34. engine cover 50 is located in cover-receiving aperture 52 and extends over thermal engine 26. Thermally-conductive strip 28 extends between engine cover 50 and panel 48 as shown in FIG. 4.

Panel 48 includes a first side surface 54 and a second side surface 56 that define a portion of cover-receiving aperture 52 as shown in FIG. 4. First side surface 54 and second side surface 56 of panel 48 are angled relative to upper surface 38 of bottom pad 34. First side surface 54 of panel 48 has an angle of about 115 degrees. Second side surface 56 of panel 48 has an angle of about 65 degrees. engine cover 50 includes a first side surface 58 and a second side surface 60. First side surface 58 of engine cover 50 faces first side surface 54 include in panel 48 and is generally parallel with first side surface 54. Second side surface 60 included in engine cover 50 faces second side surface 56 included in panel 48 and is generally parallel with second side surface 56.

In other embodiments, first side surface 54 of panel 48 has an angle of about 90 to about 180 degrees. In some embodiments, first side surface 54 of panel 48 has an angle of about 145 to about 90 degrees. In some embodiments, first side surface 54 of panel 48 has an angle of about 115 to about 145 degrees. In other embodiments, second side surface 56 of panel 48 has an angle of about 0 to about 90 degrees. In some embodiments, second side surface 56 of panel 48 has an angle of about 35 to about 90 degrees. In some embodiments, second side surface 56 of panel 48 has an angle of about 35 to about 65 degrees.

Cushion cover 18 includes an outer layer 64, an intermediate layer 66, and an inner layer 68 as shown in FIG. 4. Outer layer 64 comprises upholstery materials such as, for example, leather, cloth, microfiber, polymeric materials, and any other suitable material. Intermediate layer 66 is located between outer layer 64 and inner layer 68 and supports outer layer 64. Inner layer 68 is located between intermediate layer 66 and flexible thermally-conductive strip 28. In other portions, inner layer 68 is located between intermediate layer 66 and topper pad 36. In other embodiments, cushion cover 18 includes only one layer. In other embodiments, cushion cover 18 includes any number of layers.

In the illustrative embodiment, outer layer 64 comprises leather. Outer layer 64 is perforated to allow moisture to vent through cushion cover 18. In other embodiments, outer layer 64 does not include perforations.

Intermediate layer 66 may be relatively thin compared to outer layer 64 as suggested in FIG. 4. Intermediate layer 66 comprises leather scrim in the illustrative embodiment.

Inner layer 68 may be about 6 millimeters in thickness. Inner layer 68 comprises foam material infused with thermally conductive particles. In the illustrative example, the thermally conductive particles comprise graphene. In other embodiments, the thermally conductive particles comprise metallic particles, carbon based particles, and/or any other suitable alternative. In other embodiments, inner layer 68 comprises foam material without thermally conductive particles. In other embodiments, inner layer 68 comprises gel material. In some embodiments, the gel material is infused with thermally conductive particles. In some embodiments, the gel material comprises thermally conductive material. In some embodiments, the inner layer 68 comprises a mesh of conductive material such as, for example, a copper mesh.

Occupant support 10 further includes massage bladders 17 configured to massage occupant 11 as shown in FIG. 4. Massage bladders 17 are located between topper pad 36 and inner layer 68 of cushion cover 18 and spaced apart from thermally-conductive strip 28. Massage bladders 17 may be located between topper pad 36 and thermally-conductive strip 28. In other embodiments, massage bladders 17 are not included in occupant support 10.

Thermoelectric units 20 provide to an occupant a cold sensation when thermoelectric unit 20 is in the cooling mode and a warming sensation when thermoelectric unit 20 is in the heating mode in response to an input 22. Input 22 may be a user input 23 and/or an automatic input 25 as suggested in FIG. 1. Thermoelectric unit provides means for moving heat between thermoelectric unit 20 and occupant 11 without convective heat transfer. Thermoelectric unit 20 includes graphene strips 28, a thermoelectric device 70, a heat sink 82, and a blower unit 84 to exhaust heat generated when thermoelectric unit 20 is in the cooling mode. Thermoelectric device 70 is configured to generate heating or cooling for occupant 11 according to a polarity of an applied electric voltage. Blower 84 is configured to couple to a side or underneath heat sink 82.

Figure 5:
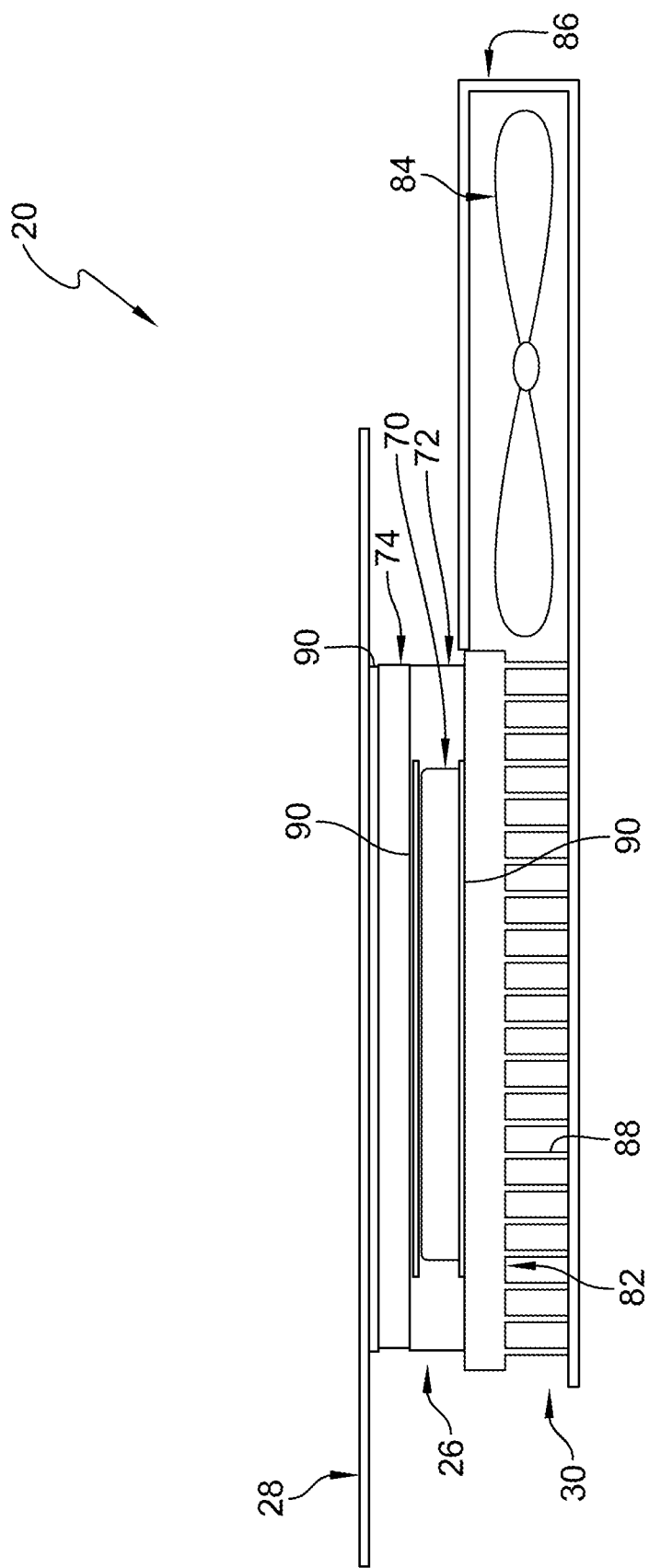
FIG. 5 is a diagrammatic view of the thermoelectric unit of FIG. 1 showing that the thermoelectric unit includes the thermally-conductive strip, the thermal engine, and the heat exchanger and showing that the thermal engine includes a thermoelectric device configured to generate heating or cooling depending on a polarity of electric energy supplied to the thermoelectric device, a support case arranged around the thermoelectric device, and a thermal transfer block coupled between the thermoelectric device and the thermally-conductive strip.

Thermoelectric unit 20 includes thermal engine 26, thermally-conductive strip 28, and heat exchanger 30 as shown in FIG. 5. Thermal engine 26 heats thermally-conductive strip 28 or removes heat from thermally-conductive strip 28 selectively in response to input 22. Thermally-conductive strip 28 disperses heat generated by thermal engine 26 to occupant 11 or conducts heat away from occupant 11 to thermal engine 26 when thermoelectric unit 20. Heat exchanger 30 is coupled to thermal engine 26 and configured to conduct rejected heat away from thermal engine 26 when thermoelectric unit 20 is in the cool mode.

Thermal engine 26 is operable in the heat mode as suggested in FIG. 2 and the cool mode as suggested in FIG. 3. In the heat mode, thermal engine 26 heats thermally-conductive strip 28 which heats occupant 11 through cushion cover 18 with conductive heating. Thermal engine 26 may cool heat exchanger 30 in the heat mode. In the cool mode, thermal engine 26 removes heat from thermally-conductive strip 28 to cool occupant 11 through cushion cover 18 with conductive heat transfer. Thermal engine 26 heats heat exchanger 30 in the cool mode.

Thermal engine 26 includes a thermoelectric device 70, a support case 72, and a thermal transfer block 74 as shown in FIG. 5. Thermoelectric device 70 provides a heated side and a cooled side in response to being powered by electrical energy. Support case 72 is arranged around thermoelectric device 70. Thermal transfer block 74 transmits heat between thermoelectric device 70 and thermally-conductive strip 28.

Thermoelectric device 70 is an integral heating and cooling device and attached to flexible thermally-conductive strip 28 to spread out the heat or heat removal over a greater area than that of thermoelectric device 70 as suggested in FIGS. 2 and 3. Thermoelectric device 70 has an upper side 78 and a lower side 80 as shown in FIG. 5. Thermoelectric device 70 is configured to heat upper side 78 and cool lower side 80 in response to receiving electric energy having a first flow direction. Thermoelectric device 70 is configured to cool upper side 78 and heat lower side 80 in response to receiving electric energy having a second flow direction opposite of the first flow direction. Thermoelectric device 70 is connected to controller 24 and controller 24 is configured to control the transmission and flow direction of electric energy to thermoelectric device 70.

Thermoelectric device 70 comprises a Peltier device in the illustrative example. Thermoelectric device 70 is a solid state device. In some embodiments, thermoelectric device 70 may include P and N couples that are spaced further apart to increase a size of thermoelectric device 70. As a result, the area of contact with thermally-conductive strip 28 would increase. In some such embodiments, thermal transfer block 74 may be omitted.

Thermoelectric device 70 has a generally square surface area as suggested in FIG. 1. Thermoelectric device 70 has a dimension of 30 millimeters by 30 millimeters in the illustrative example. In other examples, thermoelectric device 70 has a dimension of 40 millimeters by 40 millimeters.

Support case 72 comprises foam material and is arranged around thermoelectric device 70. In other embodiments, support case 72 is arranged around thermoelectric device 70 and thermal transfer block 74.

Thermal transfer block 74 is coupled to thermoelectric device 70 and thermally-conductive strip 28 as shown in FIG. 5. Thermal transfer block 74 distributes heat from thermoelectric device 70 to thermally-conductive strip 28 when thermoelectric unit 20 is in the heat mode and collects heat from thermally-conductive strip 28 and transmits the heat to thermoelectric device 70 when thermoelectric unit 20 is in the cool mode. Thermal transfer block 74 spreads heat flow over a wider area than thermoelectric device 70 to provide a large area of contact for the thermally-conductive strip 28. Thermal transfer block 74 extends beyond thermoelectric device 70 and extends over support case 72.

Figure 13:
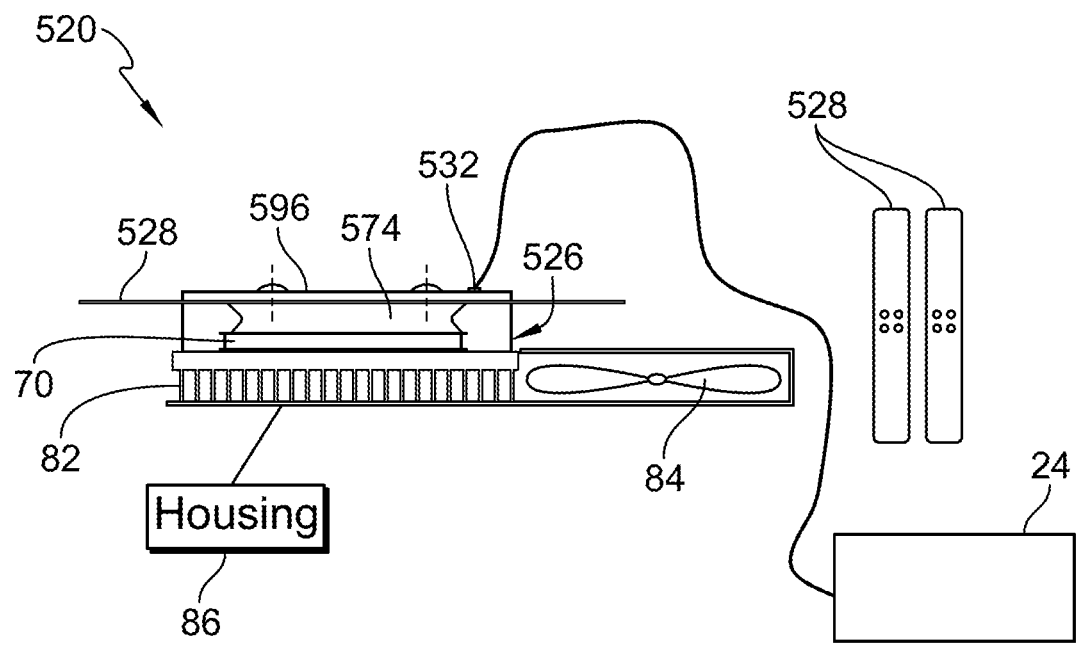
FIG. 13 is a diagrammatic view of another thermoelectric unit for use in the occupant support showing that the thermoelectric unit further includes a top plate coupled to the thermally-conductive strip to locate the thermally-conductive strip between the top plate and the thermal transfer block and showing that a thermocouple is connected between the thermoelectric unit and the controller.

Thermal transfer block 74 comprises thermally-conductive material. In some embodiments, thermal transfer block 74 comprises aluminum alloy or any other suitable thermally-conductive material. In other embodiments, thermal transfer block comprises other suitable thermally conductive material such as, for example, copper and carbon based materials. In some embodiments, thermal transfer block is hourglass shaped as shown in FIG. 13.

Thermally conductive strip 28 is thermally connected to thermal transfer block 74 included in thermal engine 26 as shown in FIG. 5. Thermally conductive strip 28 is extends outwardly away from the thermal engine 26 to provide heating and cooling to a greater surface area than that of a heating and cooling surface area of thermal engine 26. Thermally conductive strip 28 is flexible and configured to deform to form to a contour of the occupant 11.

Thermally-conductive strip 28 includes a first arm 76, a second arm 78, and an intermediate portion 80 as shown in FIG. 5. Thermal transfer block 74 is coupled to intermediate portion 80. Thermally-conductive strip 28 is bonded to thermal transfer block 74 in the illustrative example. Thermally-conductive strip 28 is bonded to thermal transfer block 74 using adhesive. In other embodiments, thermally-conductive strip 28 is coupled to thermal transfer block 74 using one or more of adhesive, glue, and fasteners. Thermally-conductive strip 28 may include only first arm 76, second arm 78, and intermediate portion 80.

First arm 76 of thermally conductive strip 28 extends away from thermal transfer block 74 in a first direction and second arm 78 of thermally conductive strip 28 extends away from thermal transfer block 74 in a second direction. Intermediate portion 80 is generally flat and parallel with a top surface of thermal transfer block 74. first arm 76 and second arm 78 extend away from thermal transfer block at an angle and flatten out to be generally parallel with/conform to cushion cover 18.

First arm 76 and second arm 78 extend away from thermal transfer block at about 65 degrees relative to ground. In some embodiments, first arm 76 and second arm 78 extend away from thermal transfer block at about 0 degrees to about 90 degrees relative to ground. In some embodiments, first arm 76 and second arm 78 extend away from thermal transfer block at about 30 degrees to about 65 degrees relative to ground. In some embodiments, first arm 76 and second arm 78 extend away from thermal transfer block at about 90 degrees relative to ground.

Thermally-conductive strip 28 comprises a plurality of layers of graphene. In the illustrative embodiment, the thermally-conductive strip 28 includes an outer layer of polyethylene. In some embodiments, each layer of graphene is coated in polymeric material such as, for example, polyethylene. In other embodiments, the layers of graphene form a graphite strip.

In other embodiments, thermally conductive strip 28 includes one or more of copper sheets, copper woven material, thermally conductive polymers, carbon based conductive materials such as, for example, carbon fiber fabric or graphite fabrics, woven pyrolytic graphite mat, and graphene nanoplatelet sheets.

Figure 6:
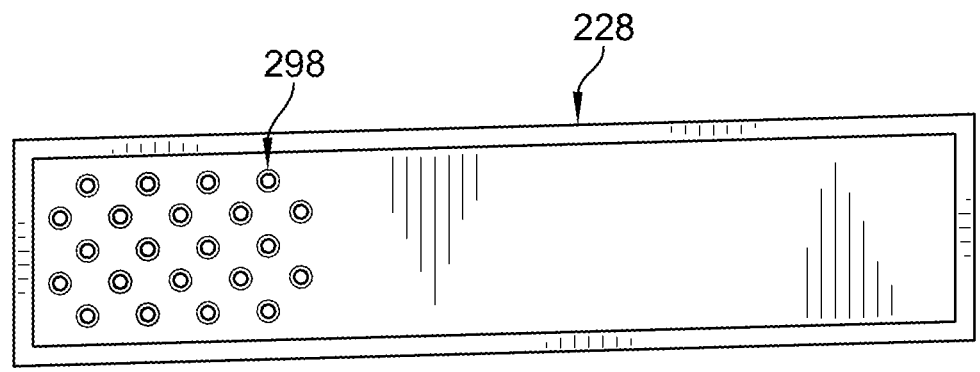
FIG. 6 is another embodiment of a thermally-conductive strip in accordance with the present disclosure showing that the thermally-conductive strip is formed to include a plurality of holes.
Figure 7:
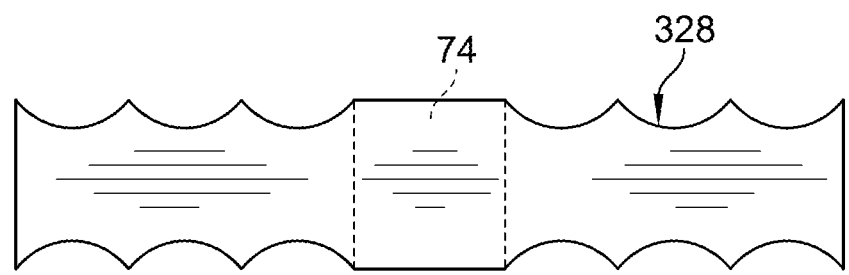
FIG. 7 is another embodiment of a thermally-conductive strip in accordance with the present disclosure showing that the thermally-conductive strip is formed to include a plurality of scalloped edges.
Figure 8:
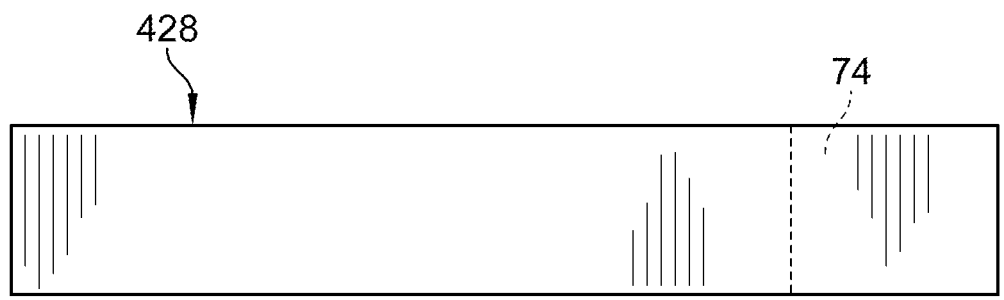
FIG. 8 is another embodiment of a thermoelectric unit in accordance with the present disclosure showing that the thermal engine is coupled to one end of the thermally-conductive strip.

Thermally conductive strip 28 is rectangular shaped and includes two linear sides longer sides and curved ends as shown in FIG. 1. In another embodiment, each side of a thermally conductive strip 228 is linear as shown in FIG. 6. In some embodiments, a thermally conductive strip 228 is formed to include apertures 298 therein to allow moisture and air to pass through strip 228 as shown in FIG. 6. In some embodiments, sides of a thermally conductive strip 328 are scalloped as shown in FIG. 7. In some embodiments, thermal transfer block 74 is coupled to a thermally conductive strip 428 at one end of thermally conductive strip 428 as shown in FIG. 8.

The proximity and contact with thermoelectric device 70 maximizes efficiency when viewed as a measure of time to thermal sensation. Time to thermal sensation is a metric that measures the amount of time it takes for an occupant 11 sitting in occupant support 10 to feel thermoelectric unit 20 providing or removing heat. Thermally-conductive strip 28 is a flexible, thermally-conductive material for dissipating heat, moving thermal energy from thermoelectric device 70 to cushion cover 18 to create a temperature gradient.

Thermally-conductive material has relatively high thermal conductivity properties and may be carbon based. One such example is graphene, for spreading temperature out over cushion cover 18. Graphene is an allotrope of carbon and it includes single sheets of graphite. To increase the lifetime of the graphene sheet, provide continuously support to keep high thermal conductivity, and to provide abrasion resistance, an additional thin plastic sheet layer may be added to the graphene to exhibit greater strength and resistance to ongoing stress and strain from occupant 11 getting in and out of occupant support 10. Carbon-based materials promote heat transfer and heat distribution directly to an entire surface area of the conductive material, reducing the need to reinforce heat distribution.

Heat may be transferred through cushion cover 18 to occupant 11 through a combination of conductive and radiative heat transfer to provide warming sensation to occupant 11. Each thermally-conductive strip 28 may have a size of about 3 inches by about 12 inches.

Thermoelectric unit 20 further includes a supplemental thermally-conductive strip 29 as shown in FIG. 4. Supplemental thermally-conductive strip 29 extends over engine cover 50 and interconnects first arm 76 and second arm 78 of thermally-conductive strip 28. Supplemental thermally-conductive strip 29 is coupled to thermally-conductive strip 28 in the illustrative embodiment. Supplemental thermally-conductive strip 29 is substantially similar to thermally-conductive strip 28 and the description of thermally-conductive strip 28 is incorporated by reference to apply to supplemental thermally-conductive strip 29.

Heat exchanger 30 includes a heat sink 82, a blower 84, and a housing 86 as shown in FIG. 5. Heat sink 82 is coupled to thermoelectric device 70 to transmit heat between thermoelectric device 70 and air surrounding heat exchanger 30. Blower 84 is configured to push air through heat sink 82. Housing 86 is arranged around blower 84 and a portion of heat sink 82 to direct the air pushed by blower 84 at and through heat sink 82.

Heat sink 82 includes a plurality of fins 88 as shown in FIG. 5. Heat sink 82 is located under thermoelectric device 70 to locate thermoelectric device between heat sink 82 and thermal transfer block 74. In other embodiments, heat sink 82 is located to a lateral side of thermoelectric device 70.

Blower 84 is located on a lateral side of heat sink 82 as shown in FIG. 5. Blower 84 pushes air through heat sink 82 toward an opposite side of heat sink 82. In other embodiments, blower 84 is located beneath heat sink 82 to locate heat sink 82 between blower 84 and thermoelectric device 70. Blower 82 may be rearranged or remotely mounted (in combination with using ducts) to push or pull air.

Thermoelectric unit 20 includes thermally conductive interfaces 90 between thermally-conductive strip 28, thermal engine 26, and heat exchanger 30. Thermally conductive interfaces 90 may be used between components of each of thermally-conductive strip 28, thermal engine 26, and heat exchanger 30. Thermally conductive interface 90 includes one or more of thermal grease, silver filled gels, filled waxes, and silicones. Interface 90 helps make full thermal contact between components which may increase the efficiencies of each thermal communication. Interface 90 is located between thermoelectric device 70 and heat sink 82 as shown in FIG. 5. Interface 90 is located between thermoelectric device 70 and thermal transfer block 74.

Figure 9:
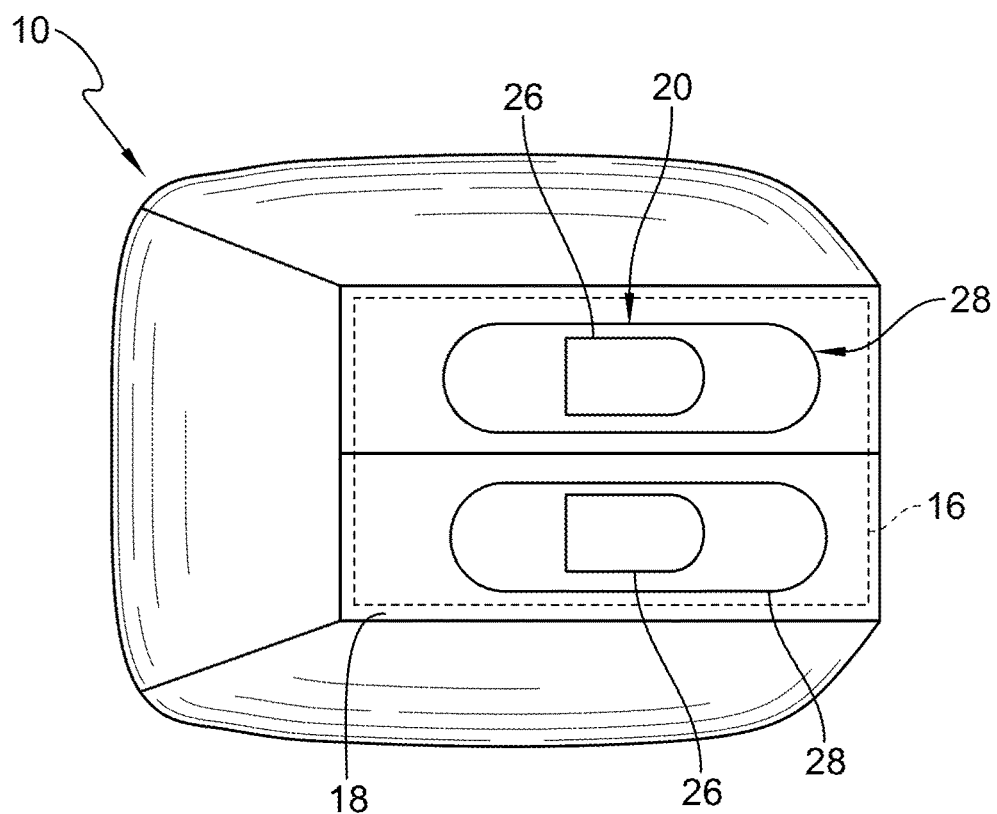
FIG. 9 is a diagrammatic view of the seat bottom included in the occupant support of FIG. 1 showing a first thermoelectric unit and a second thermoelectric unit spaced apart from the first thermoelectric unit in lateral relation.
Figure 10:
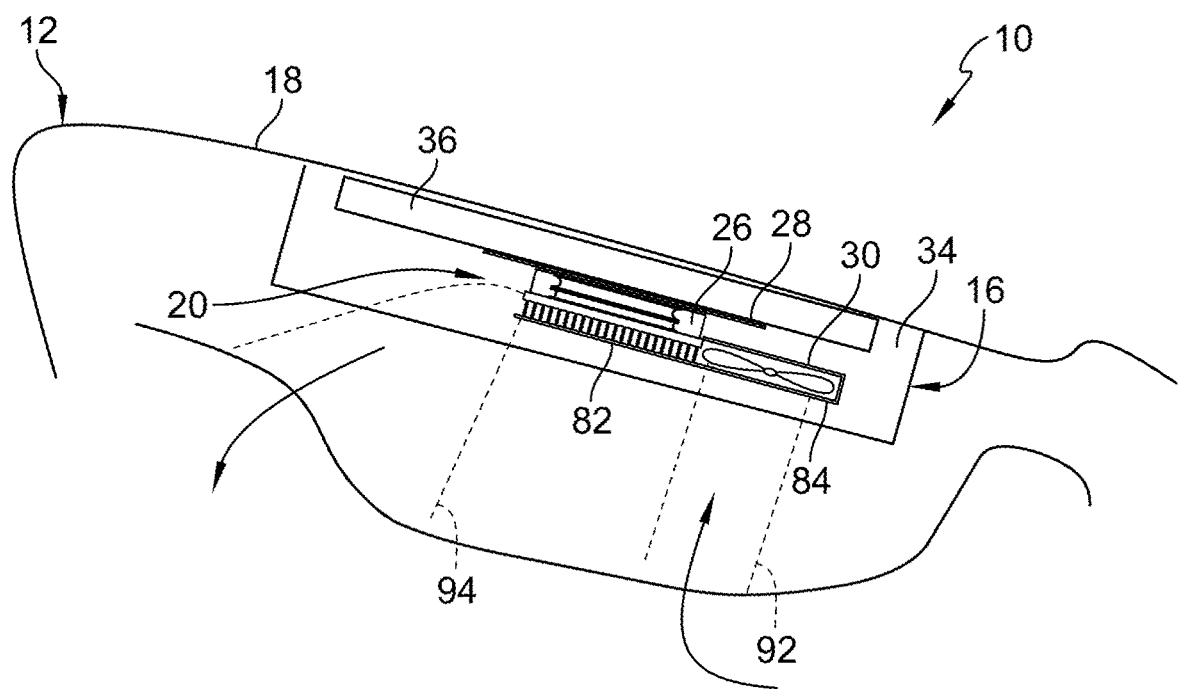
FIG. 10 is a diagrammatic view of the seat bottom of FIG. 9 showing that the seat bottom is formed to include a rear passageway and a front passageway, the rear passageway is in fluid communication with a blower included in the thermoelectric unit, and the front passageway is in fluid communication with a heat sink included in the thermoelectric unit to cause the airflow to travel from the rear passageway, through the blower, through the heat sink, and exhaust from the front passageway.

FIGS. 9 and 10 show an arrangement of thermoelectric units 20 in seat bottom 12. Thermoelectric units 20 are spaced apart laterally as shown in FIG. 9. Each thermoelectric unit extends between a front and a back of seat bottom 12. Thermoelectric units 20 are located between topper pad 36 and bottom pad 34. In other embodiments, thermoelectric units 20 are located between topper pad 36 and cushion cover 18.

Bottom pad 34 is formed to include a rear passage 92 and a forward passage 94 as shown in FIG. 10. Rear passage 92 is located under blower 84 and is in fluid communication with blower 84. Forward passage 94 is spaced apart from rear passage 92 and is in fluid communication with heat sink 82. Rear passage 92 may act as an intake passage. Forward passage 94 may act as an exhaust passage. Air is drawn through rear passage 92 by blower 84 and directed through heat sink 82. The air is pushed through heat sink 82 out a front of bottom pad 34 through forward passage 94. Forward passage 94 may direct the exhaust air toward floor 13 and/or toward feet of occupant 11. Rear passage 92 and forward passage 94 may be defined by forming holes in bottom pad 34 and/or by using conduits to line holes formed in bottom pad 34.

Figure 11:
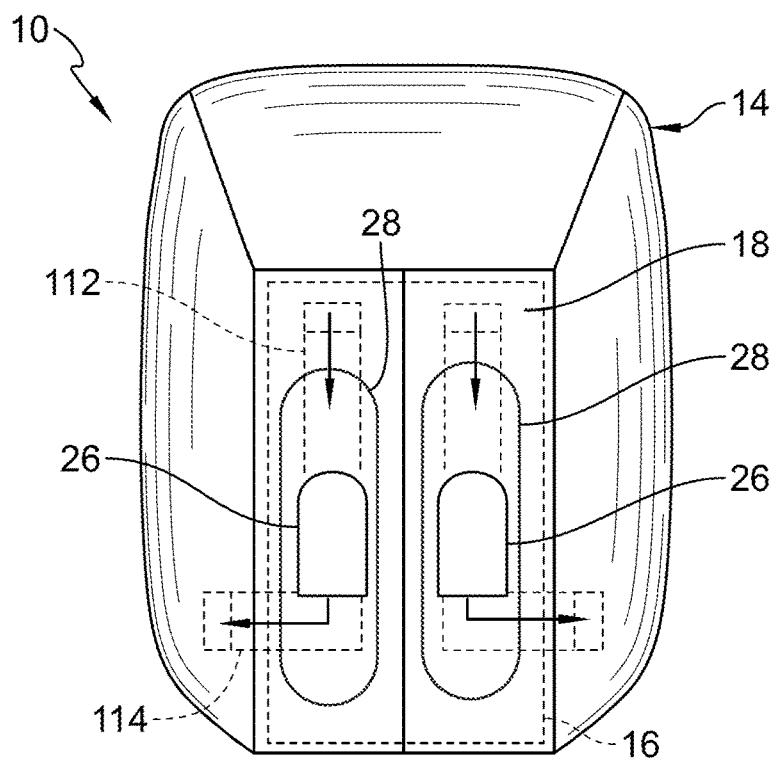
FIG. 11 is a diagrammatic view of the seat back of FIG. 1 showing a first thermoelectric unit and a second thermoelectric unit spaced apart from the first thermoelectric unit in lateral relation and suggesting that the cushion is formed to include an upper passageway and a lower passageway, and that the airflow is configured to travel from the upper passageway through the thermoelectric unit and out of the lower passageway.
Figure 12:
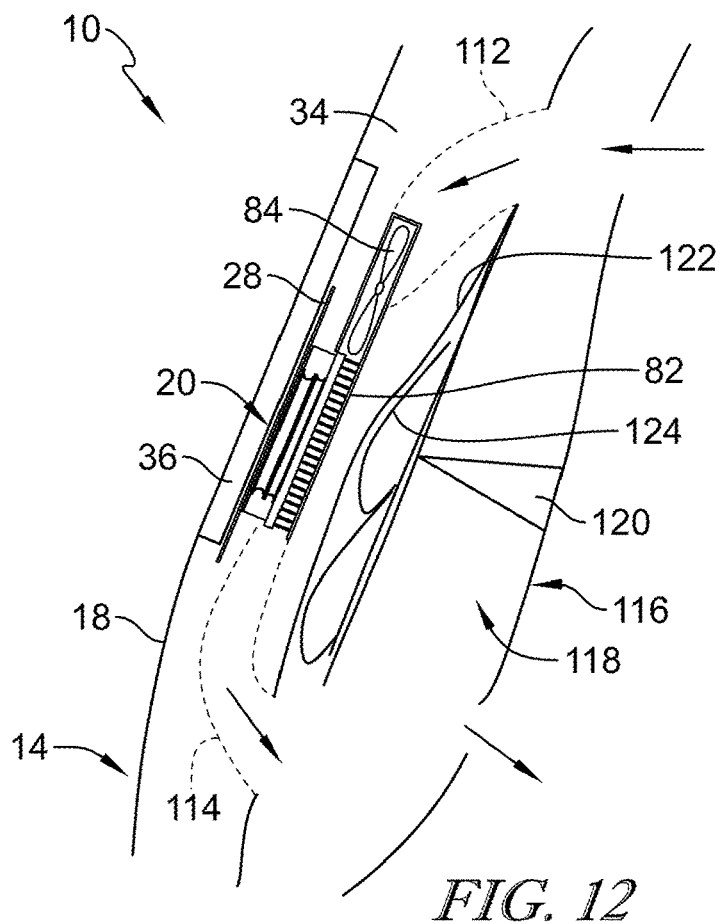
FIG. 12 is a diagrammatic view of the seat back of FIG. 11 showing the upper passageway and the lower passageway and further showing a cavity and a divider located in the cavity to block short circuit communication of the upper and lower passageways.

FIGS. 11 and 12 show an arrangement of thermoelectric units 20 in seat back 14. Thermoelectric units 20 are spaced apart laterally as shown in FIG. 11. Each thermoelectric unit extends between a top and a bottom of seat back 14. Thermoelectric units 20 are located between topper pad 36 and bottom pad 34. In other embodiments, thermoelectric units 20 are located between topper pad 36 and cushion cover 18.

Bottom pad 34 is formed to include an upper passage 112 and a lower passage 114 as shown in FIG. 11. Upper passage 112 extends through a back panel 116 of seat back 14 and is in fluid communication with blower 84. Lower passage 114 is spaced apart from upper passage 112 and is in fluid communication with heat sink 82. Upper passage 112 may act as an intake passage. Lower passage 114 may act as an exhaust passage.

Air is drawn through upper passage 112 by blower 84 and directed through heat sink 82. The air is pushed through heat sink 82 out sides of bottom pad 34 through lower passage 114 as shown in FIG. 11. In some embodiments, the air is pushed through heat sink 82 out back of bottom pad 34 through lower passage 114 as shown in FIG. 12. Upper passage 112 and lower passage 114 may be defined by forming holes in bottom pad 34 and/or by using conduits to line holes formed in bottom pad 34.

Back panel 116 is formed to define a cavity 118 as shown in FIG. 12. Cavity 118 may be void or may be filled with foam. A divider 120 is located in cavity 118 to block fluid communication of upper and lower passages 112, 114 through cavity 118. Seat back 14 further includes a foam surface 122 and a plurality of lumbar supports 124 that may include bladders. Thermoelectric units 20 are located between topper pad 36 and lumbar supports 124.

Figure 14:
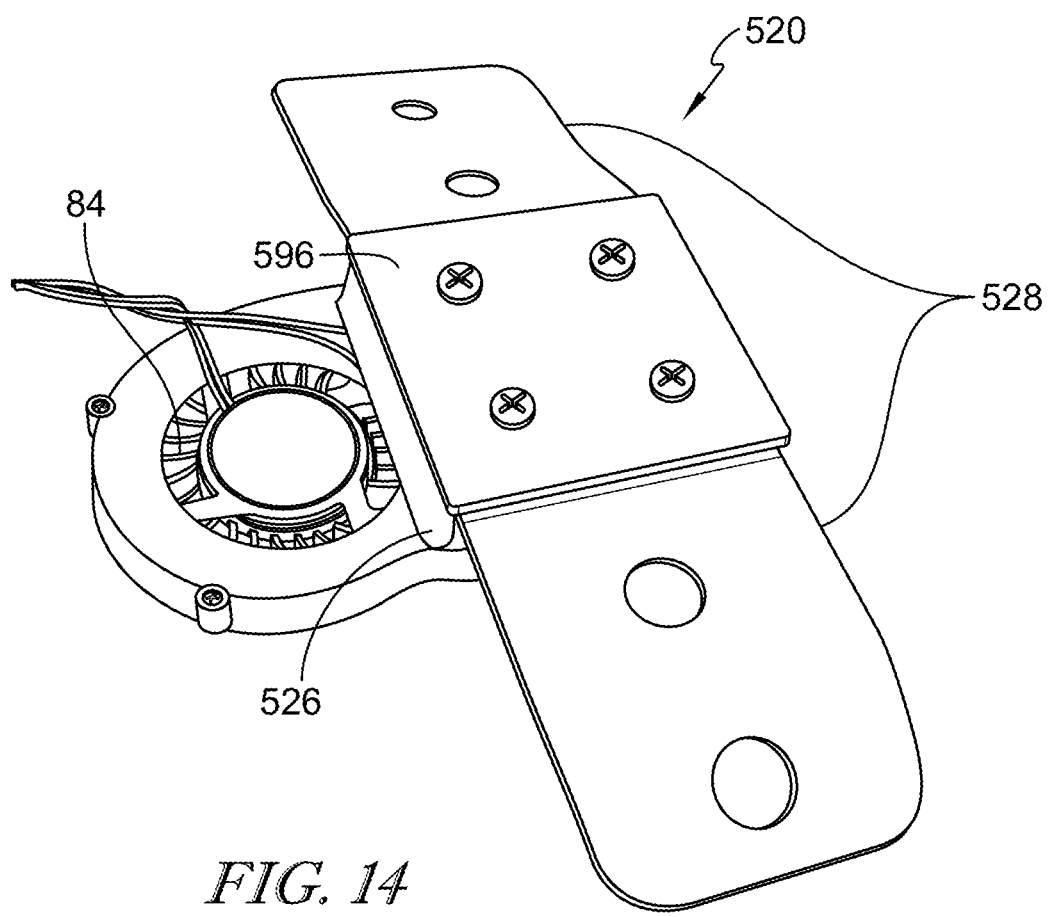
FIG. 14 is a diagrammatic view of the thermoelectric unit of FIG. 13.

Another embodiment of a thermoelectric unit 520 for use in an occupant support 10 is shown in FIGS. 13 and 14. The thermoelectric unit 520 is substantially similar to the thermoelectric unit 20 shown in FIGS. 1-12 and described herein. Accordingly, similar reference numbers in the 500 series indicate features that are common between the thermoelectric unit 20 and the thermoelectric unit 520. The description of the thermoelectric unit 20 is incorporated by reference to apply to the thermoelectric unit 520, except in instances when it conflicts with the specific description and the drawings of the thermoelectric unit 520.

Thermoelectric unit 520 includes an outer plate 596 coupled to thermally-conductive strip 528 as shown in FIGS. 13 and 14. Outer plate 596 comprises thermally-conductive material.

Outer plate 596 is coupled to thermally-conductive strip 528 and thermal engine 526 as shown in FIG. 13. Fasteners extend through outer plate 596 and through holes formed in thermally-conductive strip 528 and into thermal engine 526. Outer plate 596 has a footprint as viewed from above that is generally the same as a footprint of the support case 72 and thermoelectric device 70.

Thermal transfer block 74 is hourglass shaped. Support case 72 extends around thermoelectric device 70 and thermal transfer block 74. A thermocouple 532 is coupled to a top surface of outer plate 596. Thermocouple 532 is connected with controller 24 and controller is configured to adjust the power and polarity to thermoelectric device 70 based on the measurements received from thermocouple 532.

Figure 15:
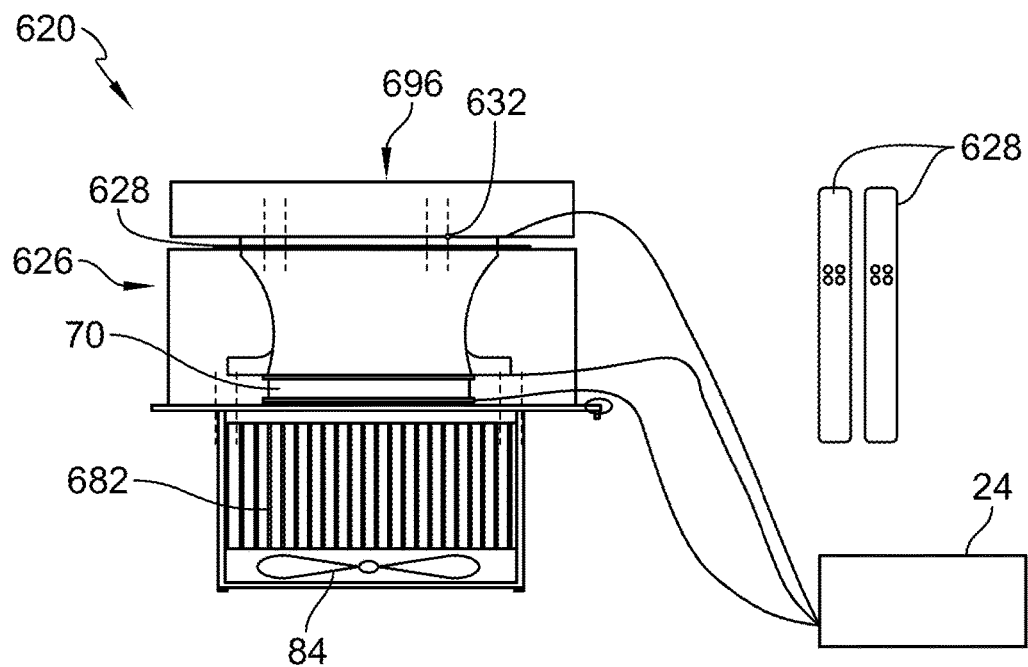
FIG. 15 is a diagrammatic view of another thermoelectric unit for use in the occupant support showing that the thermoelectric unit further includes a top plate coupled to the thermally-conductive strip to locate the thermally-conductive strip between the top plate and the thermal transfer block, a thermocouple is connected between the thermoelectric unit and the controller, and the thermal transfer block is relatively large and hour-glass shaped.

Another embodiment of a thermoelectric unit 620 for use in an occupant support 10 is shown in FIG. 15. The thermoelectric unit 620 is substantially similar to the thermoelectric unit 20 shown in FIGS. 1-12 and described herein. Accordingly, similar reference numbers in the 600 series indicate features that are common between the thermoelectric unit 20 and the thermoelectric unit 620. The description of the thermoelectric unit 20 is incorporated by reference to apply to the thermoelectric unit 620, except in instances when it conflicts with the specific description and the drawings of the thermoelectric unit 620.

As shown in FIG. 15, blower 84 is located below heat sink 82 to locate heat sink between blower 84 and thermoelectric device 70. Thermal transfer block 74 is hourglass shaped and has a greater height relative to other embodiments. Thermoelectric unit 620 includes an outer plate 696 coupled to thermally-conductive strip 628. A thermocouple 632 is coupled to a top surface of outer plate 696. Thermocouple 632 is connected with controller 24 and controller is configured to adjust the power and polarity to thermoelectric device 70 based on the measurements received from thermocouple 632.

Figure 16:
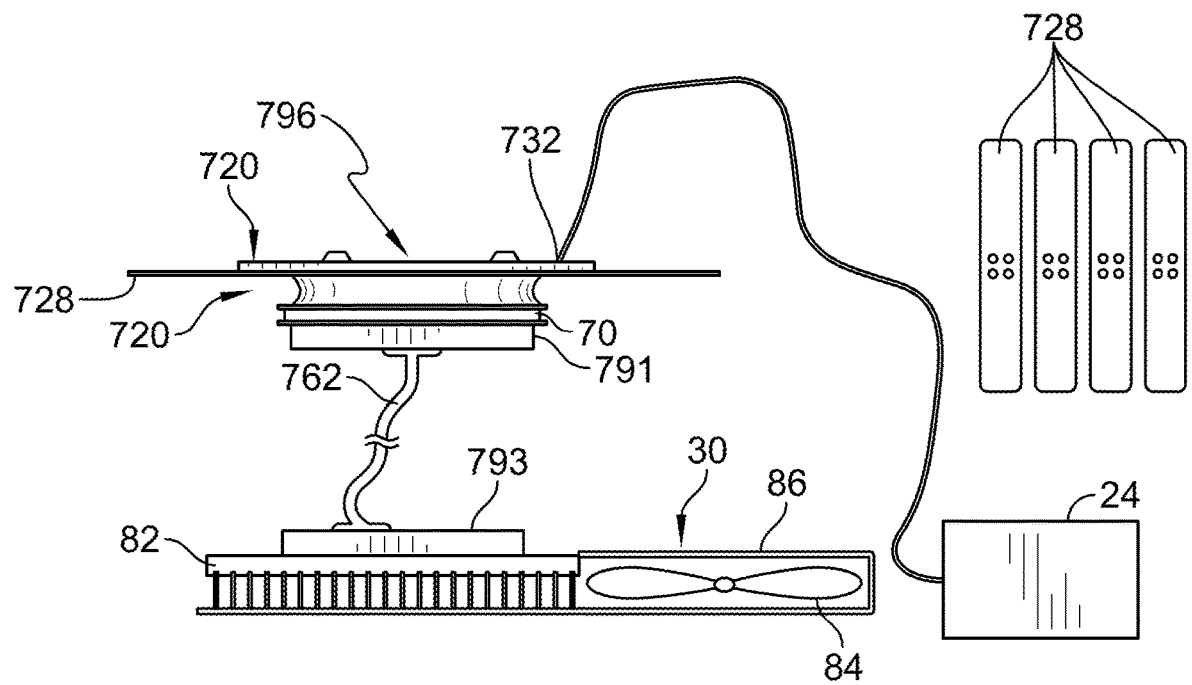
FIG. 16 is a diagrammatic view of another thermoelectric unit for use in the occupant support showing that the thermoelectric unit further includes a top plate coupled to the thermally-conductive strip to locate the thermally-conductive strip between the top plate and the thermal transfer block, a thermocouple is connected between the thermoelectric unit and the controller, the thermal transfer block is hour-glass shaped; and further showing that the thermoelectric unit further includes a flexible heat conduit configured to transmit heat between the thermoelectric device and the heat exchanger.
Figure 17:
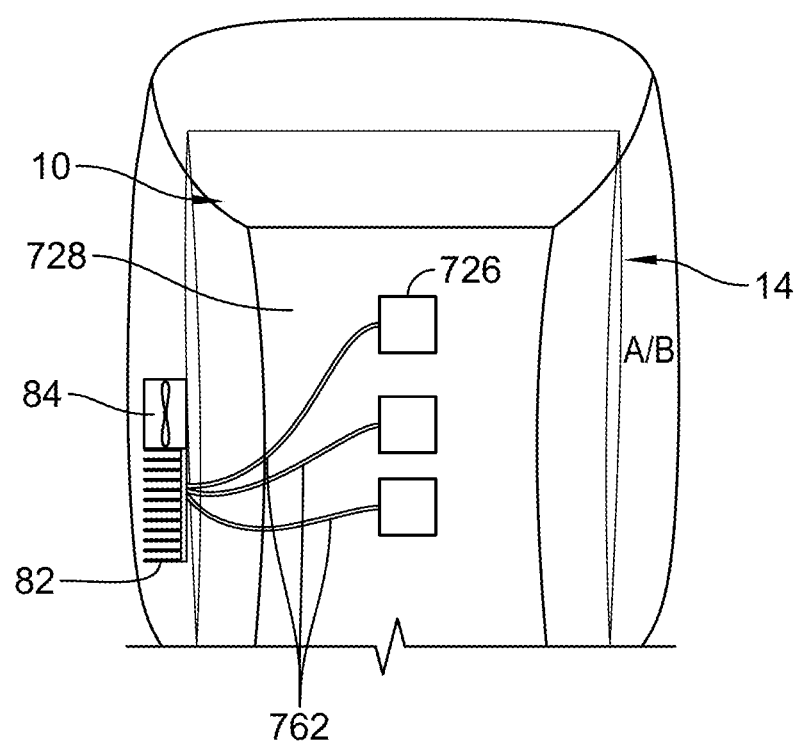
FIG. 17 is a diagrammatic view of a seat back and the thermoelectric unit of FIG. 16 showing that a plurality of thermoelectric devices are coupled to a single heat exchanger via a plurality of heat conduits.
Figure 18:
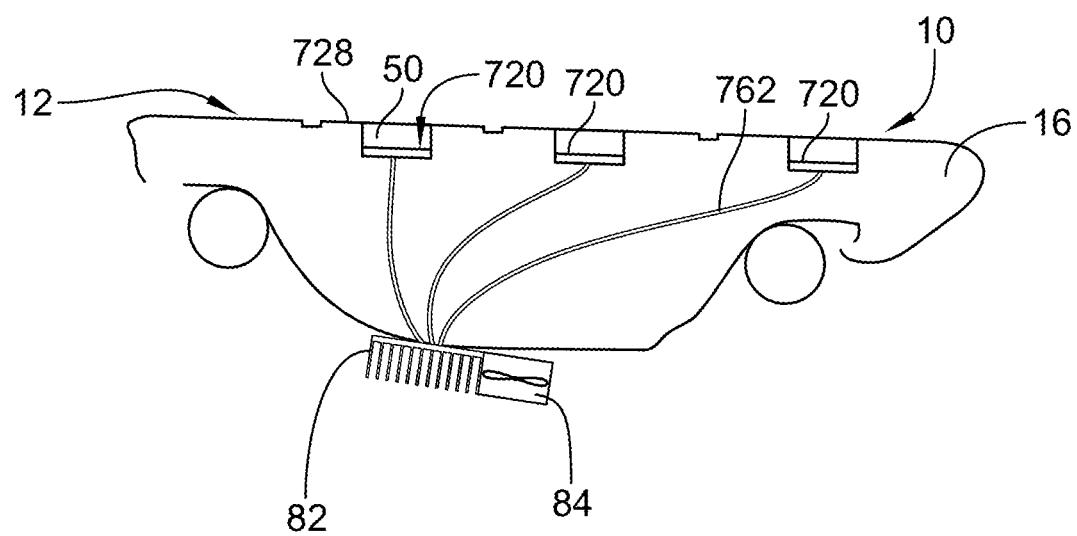
FIG. 18 is a diagrammatic view of a seat bottom and the thermoelectric unit of FIG. 16 showing that a plurality of thermoelectric devices are coupled to a single heat exchanger via a plurality of heat conduits.

Another embodiment of a thermoelectric unit 720 for use in an occupant support 10 is shown in FIGS. 16-18. The thermoelectric unit 720 is substantially similar to the thermoelectric unit 20 shown in FIGS. 1-12 and described herein. Accordingly, similar reference numbers in the 700 series indicate features that are common between the thermoelectric unit 20 and the thermoelectric unit 720. The description of the thermoelectric unit 20 is incorporated by reference to apply to the thermoelectric unit 720, except in instances when it conflicts with the specific description and the drawings of the thermoelectric unit 720.

Thermoelectric unit 720 includes an outer plate 796 coupled to thermally-conductive strip 728 as shown in FIG. 16. Outer plate 796 comprises thermally conductive material. Outer plate 796 is coupled to thermally-conductive strip 728 and thermal engine 726 as shown in FIG. 16. Fasteners extend through outer plate 796 and through holes formed in thermally-conductive strip 728 and into thermal engine 726.

A thermocouple 732 is coupled to a top surface of outer plate 796. Thermocouple 732 is connected with controller 24 and controller 24 is configured to adjust the power and polarity to thermoelectric device 70 based on the measurements received from thermocouple 732.

A flexible heat conduit 762 extends between heat sink 82 and thermoelectric device 70. Conduit 762 includes flexible features and is integrated into cushion 16 and is configured to move heat through conductive and radiative heat transfer. Conduit 762 allows for compact configurations by separating thermoelectric unit 20 into sub-assemblies. By using conduit 762, heat sink 82 and blower 84 may be uncoupled from thermoelectric device 70 allowing for more flexibility in occupant support 10 integration. Conduit 762 allows for one heat sink 82 and one blower 84 to be used with multiple thermoelectric devices 70. Thermoelectric unit 720 further includes thermally conductive plates 791, 793 coupled to thermoelectric device 70 and heat sink 82.

Thermoelectric unit 326 includes a flexible conduit 762 to connect heat sink 82 with thermoelectric device 70 for heat transfer between thermoelectric device 70 and occupant 11 as shown in FIG. 16. Multiple heat conduits 762 may be integrated into seat back 314 using a single heat sink 82 and single blower 84 to provide means for heat transfer as shown in FIG. 17. Multiple heat conduits 762 may be integrated into seat bottom 312 using a single heat sink 82 and single blower 84 to provide means for heat transfer as shown in FIG. 18.

Figure 19:
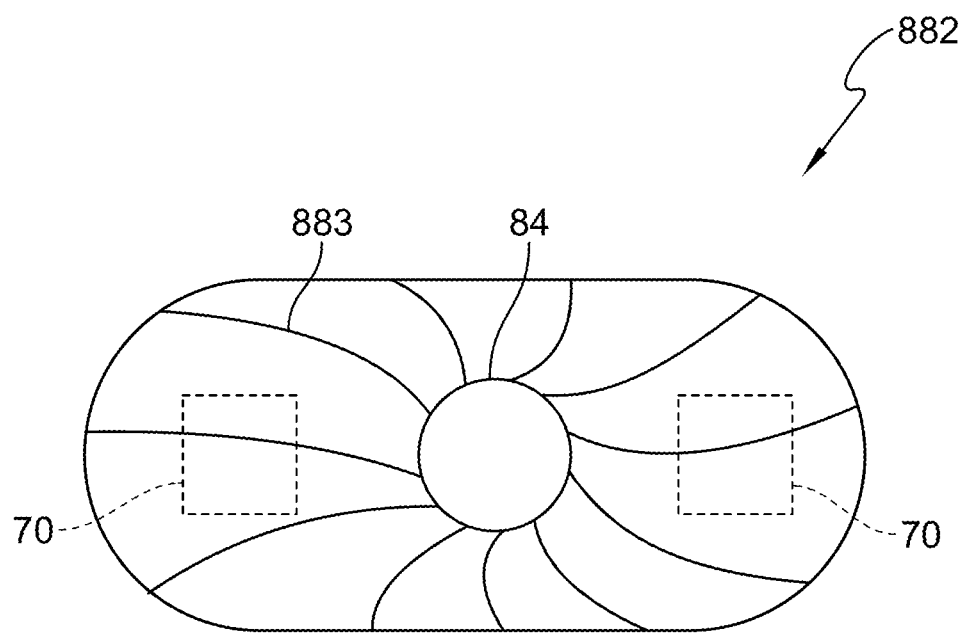
FIG. 19 is a diagrammatic view of another embodiment of a heat sink showing that the heat sink includes curved fins and a plurality of thermoelectric devices coupled to the heat sink.

Another embodiment of a heat sink 882 is shown in FIG. 19. Heat sink 882 is oblong and included curved fins 883. A plurality of thermoelectric devices 70 are coupled to heat sink 882.

The invention claimed is:

1. An occupant support comprising
   a cushion,
   a cushion cover arranged around at least a portion the cushion, and
   a thermoelectric unit configured to selectively heat and cool an occupant of the occupant support with conductive heat transfer through the cushion cover, the thermoelectric unit includes a thermal engine located in the cushion and a flexible thermally-conductive strip located between the thermal engine and the cushion cover, the flexible thermally-conductive strip coupled to the thermal engine, and the thermoelectric unit configured to move between a heating mode in which the thermal engine heats the flexible thermally-conductive strip and a cooling mode in which the thermal engine removes heat from the flexible thermally-conductive strip,
   wherein the flexible thermally-conductive strip includes an intermediate portion, a first arm that extends away from the intermediate portion, and a second arm that extends away from the intermediate portion opposite the first arm to locate the intermediate portion between the first arm and the second arm and the thermal engine is coupled to the intermediate portion of the flexible thermally-conducive strip, wherein the cushion includes a bottom pad and a topper pad, the bottom pad is spaced apart from the cushion cover to locate the topper pad between the bottom pad and the cushion cover, the thermal engine is located in the bottom pad, the topper pad includes a panel and an engine cover, the panel is arranged along the bottom pad and is formed to include a cover-receiving aperture therein, and the engine cover is located in the cover-receiving aperture between the thermal engine and the cushion cover.

2. The occupant support of claim 1, wherein the thermoelectric unit further includes a supplemental thermally-conductive strip spaced apart from the thermal engine to locate the engine cover between the supplemental thermally-conductive strip and the thermal engine and the supplemental thermally-conductive strip extends between and interconnects the first arm of the flexible thermally-conductive strip and the second arm of the flexible thermally-conductive strip.

3. The occupant support of claim 1, wherein the first arm extends between the panel and the engine cover at an angle and the angle is between 30 degrees and 65 degrees.

4. The occupant support of claim 3, wherein the angle is 65 degrees.

5. The occupant support of claim 1, wherein the first arm and the second arm are formed to include a plurality of scalloped edges.

6. The occupant support of claim 1, wherein the cushion cover comprises a plurality of thermally conductive particles.

7. The occupant support of claim 6, wherein the cushion cover comprises foam and the plurality of thermally conductive particles are embedded in the foam.

8. The occupant support of claim 6, wherein the cushion cover comprises a gel and the plurality of thermally conductive particles are suspended in the gel.

9. The occupant support of claim 1, wherein the thermoelectric unit further includes a heat exchanger coupled to the thermal engine, the heat exchanger includes a heat sink and a blower, the heat sink is coupled to the thermal engine to locate the thermal engine between the heat sink and the flexible thermally-conductive strip, and the blower is coupled to a lateral side of the heat sink.

10. The occupant support of claim 1, further comprising another thermoelectric unit located in the cushion and the thermoelectric unit is spaced apart from the another thermoelectric unit laterally.

11. An occupant support comprising
a cushion,
a cushion cover arranged around at least a portion the cushion, and
a thermoelectric unit configured to selectively heat and cool an occupant of the occupant support with conductive heat transfer through the cushion cover, the thermoelectric unit includes a thermal engine located in the cushion and a flexible thermally-conductive strip located between the thermal engine and the cushion cover, the flexible thermally-conductive strip coupled to the thermal engine, and the thermoelectric unit configured to move between a heating mode in which the thermal engine heats the flexible thermally-conductive strip and a cooling mode in which the thermal engine removes heat from the flexible thermally-conductive strip,
wherein the thermoelectric unit further includes a heat exchanger coupled to the thermal engine, the heat exchanger includes a heat sink and a blower, the heat sink is coupled to the thermal engine to locate the thermal engine between the heat sink and the flexible thermally-conductive strip, and the blower is coupled to a lateral side of the heat sink,
wherein the thermal engine includes a thermoelectric device, a support case, and a thermal transfer block, the thermoelectric device is configured to provide heating and cooling selectively in response to receiving electric energy, the support case is arranged around the thermoelectric device, and the thermal transfer block is coupled to the thermoelectric device and the flexible thermally-conductive strip.

12. The occupant support of claim 11, wherein the cushion comprises foam and a plurality of thermally conductive particles embedded in the foam.

13. The occupant support of claim 11, wherein the thermal transfer block comprises metallic material and extends over the support case and the thermoelectric device.

14. The occupant support of claim 11, wherein the thermoelectric unit further includes thermally conductive interface located between the thermal transfer block and the flexible thermally-conductive strip, between the thermal transfer block and the thermoelectric device, and between the thermoelectric device and the heat sink.

15. The occupant support of claim 11, wherein the flexible thermally-conductive strip is continuous and the flexible thermally-conductive strip is bonded to the thermal transfer block.

16. The occupant support of claim 11, wherein the cushion includes a bottom pad and a topper pad, the bottom pad is spaced apart from the cushion cover to locate the topper pad between the bottom pad and the cushion cover, the thermoelectric unit is located in the bottom pad, the topper pad is located between the thermoelectric unit and the cushion cover, the bottom pad is formed to include a first passage that is in fluid communication with the blower and a second passage that is in fluid communication with the heat sink, and the first passage is spaced apart from the second passage.

17. An occupant support comprising
a cushion,
a cushion cover arranged around at least a portion the cushion, and
a thermoelectric unit configured to selectively heat and cool an occupant of the occupant support with conductive heat transfer through the cushion cover, the thermoelectric unit includes a thermal engine located in the cushion and a flexible thermally-conductive strip located between the thermal engine and the cushion cover, the flexible thermally-conductive strip coupled to the thermal engine, and the thermoelectric unit configured to move between a heating mode in which the thermal engine heats the flexible thermally-conductive strip and a cooling mode in which the thermal engine removes heat from the flexible thermally-conductive strip,
wherein the thermoelectric unit further includes a heat exchanger coupled to the thermal engine, the heat exchanger includes a heat sink and a blower, the heat sink is coupled to the thermal engine to locate the thermal engine between the heat sink and the flexible thermally-conductive strip, and the blower is coupled to a lateral side of the heat sink,
wherein the cushion includes a bottom pad and a topper pad, the bottom pad is spaced apart from the cushion cover to locate the topper pad between the bottom pad and the cushion cover, the thermoelectric unit is located in the bottom pad, the topper pad is located between the thermoelectric unit and the cushion cover, the bottom pad is formed to include a first passage that is in fluid communication with the blower and a second passage that is in fluid communication with the heat sink, and the first passage is spaced apart from the second passage, wherein the occupant support is formed to define a cavity spaced apart from the thermoelectric unit, the cavity is in fluid communication with the first passage and the second passage, and the occupant support further includes a divider located in the cavity to block fluid communication between the first passage and the second passage through the cavity.

18. The occupant support of claim 17, wherein the topper pad includes a panel and an engine cover, the panel is arranged along the bottom pad and is formed to include a cover-receiving aperture therein, and the engine cover is located in the cover-receiving aperture between the thermal engine and the cushion cover.

19. An occupant support comprising
a cushion,
a cushion cover arranged around at least a portion the cushion, and
a thermoelectric unit configured to selectively heat and cool an occupant of the occupant support with conductive heat transfer through the cushion cover, the thermoelectric unit includes a thermal engine located in the cushion and a flexible thermally-conductive strip located between the thermal engine and the cushion cover, the flexible thermally-conductive strip coupled to the thermal engine, and the thermoelectric unit configured to move between a heating mode in which the thermal engine heats the flexible thermally-conductive strip and a cooling mode in which the thermal engine removes heat from the flexible thermally-conductive strip, wherein the thermoelectric unit further includes a heat exchanger coupled to the thermal engine, the heat exchanger includes a heat sink and a blower, the heat sink is coupled to the thermal engine to locate the thermal engine between the heat sink and the flexible thermally-conductive strip, and the blower is coupled to a lateral side of the heat sink, wherein the cushion includes a bottom pad and a topper pad, the bottom pad is spaced apart from the cushion cover to locate the topper pad between the bottom pad and the cushion cover, the thermoelectric unit is located in the bottom pad, the topper pad is located between the thermoelectric unit and the cushion cover, the bottom pad is formed to include a first passage that is in fluid communication with the blower and a second passage that is in fluid communication with the heat sink, and the first passage is spaced apart from the second passage, wherein the topper pad comprises foam and a plurality of thermally conductive particles embedded in the foam.

20. The occupant support of claim 19, wherein the topper pad includes a panel and an engine cover, the panel is arranged along the bottom pad and is formed to include a cover-receiving aperture therein, and the engine cover is located in the cover-receiving aperture between the thermal engine and the cushion cover.

* * * * *